United States Patent
Schwartz et al.

(10) Patent No.: US 10,625,729 B2
(45) Date of Patent: *Apr. 21, 2020

(54) CONTROL SYSTEM FOR HYBRID VEHICLES WITH HIGH DEGREE OF HYBRIDIZATION

(71) Applicant: Palo Alto Research Center Incorporated, Palo Alto, CA (US)

(72) Inventors: David E. Schwartz, San Carlos, CA (US); Sean Garner, Burlingame, CA (US); Bhaskar Saha, Redwood City, CA (US); Simon Barber, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 15/690,967

(22) Filed: Aug. 30, 2017

(65) Prior Publication Data
US 2017/0361832 A1 Dec. 21, 2017

Related U.S. Application Data

(63) Continuation of application No. 14/255,091, filed on Apr. 17, 2014, now Pat. No. 9,751,521.

(51) Int. Cl.
*B60W 20/15* (2016.01)
*B60W 10/06* (2006.01)
(Continued)

(52) U.S. Cl.
CPC ............ *B60W 20/15* (2016.01); *B60W 10/06* (2013.01); *B60W 10/10* (2013.01); *B60W 10/26* (2013.01);
(Continued)

(58) Field of Classification Search
None
See application file for complete search history.

(56) References Cited

U.S. PATENT DOCUMENTS

| 3,870,116 A | 3/1975 | Seliber |
| 3,923,115 A | 12/1975 | Helling |

(Continued)

FOREIGN PATENT DOCUMENTS

| CN | 101888943 A | 11/2010 |
| EP | 0890918 | 1/1999 |

(Continued)

OTHER PUBLICATIONS

Office Action dated Jun. 25, 2018 from CN App. No. 201510147853.2, 19 pages.

(Continued)

*Primary Examiner* — Kevin P Mahne
(74) *Attorney, Agent, or Firm* — Mueting, Raasch & Gebhardt, P.A.

(57) ABSTRACT

Systems and methods for controlling and operating a hybrid vehicle having a high degree of hybridization are disclosed. A power flow control system predicts vehicle power demand to drive the hybrid vehicle based on changing conditions during operation of the hybrid vehicle. The power flow control system controls the power flow so as to provide power to drive the hybrid vehicle based on the predicted vehicle power demand, wherein the predicted vehicle power demand is greater than a maximum.

20 Claims, 10 Drawing Sheets

(51) Int. Cl.
  *B60W 10/10* (2012.01)
  *B60W 10/26* (2006.01)
  *B60W 20/12* (2016.01)
  *B60W 40/02* (2006.01)
  *B60W 50/00* (2006.01)
  *B60W 50/06* (2006.01)
  *B60W 50/14* (2020.01)

(52) U.S. Cl.
  CPC ............ *B60W 20/12* (2016.01); *B60W 40/02* (2013.01); *B60W 50/0097* (2013.01); *B60W 50/06* (2013.01); *B60W 2050/146* (2013.01); *B60W 2530/14* (2013.01); *B60W 2550/402* (2013.01); *Y02T 10/84* (2013.01); *Y10S 903/93* (2013.01)

(56) References Cited

U.S. PATENT DOCUMENTS

| | | | |
|---|---|---|---|
| 4,309,620 A | 1/1982 | Bock | |
| 4,423,794 A | 1/1984 | Beck | |
| 4,625,823 A | 12/1986 | Frank | |
| 4,757,686 A | 7/1988 | Kawamura et al. | |
| 5,076,059 A | 12/1991 | Okada | |
| 5,406,797 A | 4/1995 | Kawamura | |
| 5,427,194 A | 6/1995 | Miller | |
| 5,636,509 A | 6/1997 | Abell | |
| 5,713,426 A | 2/1998 | Okamura | |
| 5,931,249 A | 8/1999 | Ellis et al. | |
| 6,018,694 A | 1/2000 | Egami et al. | |
| 6,186,255 B1 | 2/2001 | Shimasaki et al. | |
| 6,205,379 B1 | 3/2001 | Morisawa et al. | |
| 6,242,873 B1 | 6/2001 | Drozdz et al. | |
| 6,330,498 B2 | 12/2001 | Tamagawa et al. | |
| 6,443,125 B1 | 9/2002 | Mendler | |
| 6,469,402 B2 | 10/2002 | Morimoto et al. | |
| 6,554,088 B2 | 4/2003 | Severinsky et al. | |
| 6,659,212 B2 | 12/2003 | Geisse et al. | |
| 6,684,863 B2 | 2/2004 | Dixon et al. | |
| 6,823,853 B2 | 11/2004 | Clarkson et al. | |
| 6,931,850 B2 | 8/2005 | Frank et al. | |
| 6,956,298 B2 | 10/2005 | Kitajima et al. | |
| 6,962,223 B2 | 11/2005 | Berbari | |
| 6,995,529 B2 | 2/2006 | Sibley | |
| 7,076,954 B1 | 7/2006 | Sopko, Jr. et al. | |
| 7,178,617 B2 | 2/2007 | Morisawa et al. | |
| 7,240,748 B2 | 7/2007 | Kira et al. | |
| 7,597,164 B2 | 10/2009 | Severinsky et al. | |
| 7,654,355 B1 | 2/2010 | Williams | |
| 7,691,027 B2 | 4/2010 | Soliman et al. | |
| 7,931,107 B2 | 4/2011 | Jones, Jr. | |
| 8,028,778 B2 | 10/2011 | Luo et al. | |
| 8,043,194 B2 | 10/2011 | Soliman et al. | |
| 8,050,856 B2 | 11/2011 | Duty et al. | |
| 8,079,349 B2 | 12/2011 | Rauner et al. | |
| 8,142,329 B2 | 3/2012 | Ortmann | |
| 8,176,901 B2 | 5/2012 | Ai et al. | |
| 8,250,864 B2 | 8/2012 | Pott et al. | |
| 8,265,813 B2 | 9/2012 | Heap | |
| 8,359,145 B2 | 1/2013 | Bowman et al. | |
| 8,386,091 B2 | 2/2013 | Kristinsson et al. | |
| 8,615,336 B1 | 12/2013 | Vos | |
| 8,758,193 B2 | 6/2014 | Ichikawa et al. | |
| 8,781,664 B2 | 7/2014 | Sujan et al. | |
| 8,852,051 B2 | 10/2014 | Sujan et al. | |
| 8,959,912 B2 | 2/2015 | Hoess et al. | |
| 8,972,161 B1 | 3/2015 | Koebler et al. | |
| 9,048,765 B2 | 6/2015 | Dobbs | |
| 9,102,325 B2 | 8/2015 | Jung | |
| 9,108,528 B2 | 8/2015 | Yang et al. | |
| 9,315,178 B1* | 4/2016 | Ferguson | B60T 17/221 |
| 9,676,382 B2 | 6/2017 | Schwartz et al. | |
| 2002/0065165 A1 | 5/2002 | Lasson et al. | |
| 2007/0012493 A1 | 1/2007 | Jones | |
| 2007/0144175 A1 | 6/2007 | Sopko, Jr. et al. | |
| 2008/0022686 A1 | 1/2008 | Amdall et al. | |
| 2008/0219866 A1 | 9/2008 | Kwong et al. | |
| 2009/0211384 A1 | 8/2009 | Lass | |
| 2010/0010732 A1 | 1/2010 | Hartman | |
| 2010/0292047 A1 | 11/2010 | Saito | |
| 2010/0299054 A1 | 11/2010 | Hennequet et al. | |
| 2011/0100735 A1 | 5/2011 | Flett | |
| 2011/0295433 A1 | 12/2011 | Evans | |
| 2012/0109515 A1 | 5/2012 | Uyeki et al. | |
| 2012/0130625 A1 | 5/2012 | Srivastava | |
| 2012/0197472 A1 | 8/2012 | He et al. | |
| 2012/0208672 A1 | 8/2012 | Sujan et al. | |
| 2012/0271544 A1 | 10/2012 | Hein et al. | |
| 2012/0290149 A1 | 11/2012 | Kristinsson et al. | |
| 2013/0024179 A1 | 1/2013 | Mazzaro et al. | |
| 2013/0042617 A1 | 2/2013 | Atkins et al. | |
| 2013/0046526 A1 | 2/2013 | Yucel et al. | |
| 2013/0079966 A1 | 3/2013 | Terakawa et al. | |
| 2013/0134778 A1 | 5/2013 | Tamanaha | |
| 2013/0269340 A1 | 10/2013 | Schumacher et al. | |
| 2013/0296107 A1 | 11/2013 | Nedorezov et al. | |
| 2013/0296122 A1* | 11/2013 | Banker | B60W 10/196 477/5 |
| 2014/0205426 A1 | 7/2014 | Costall | |
| 2014/0346865 A1 | 11/2014 | Akashi et al. | |
| 2014/0379206 A1* | 12/2014 | Martin | G01M 15/02 701/32.8 |
| 2015/0019132 A1 | 1/2015 | Gusikhin et al. | |
| 2015/0134192 A1* | 5/2015 | Kakinuma | G07C 5/008 701/31.4 |
| 2015/0224864 A1 | 8/2015 | Schwartz et al. | |
| 2015/0258986 A1 | 9/2015 | Hayakawa | |
| 2015/0298684 A1 | 10/2015 | Schwartz et al. | |
| 2017/0045890 A1* | 2/2017 | Gurin | G06Q 10/0836 |

FOREIGN PATENT DOCUMENTS

| | | |
|---|---|---|
| EP | 0903259 | 3/2003 |
| EP | 0933246 | 6/2004 |
| EP | 0916547 | 12/2004 |
| EP | 1442909 | 9/2006 |
| EP | 1869609 | 12/2007 |
| EP | 2251805 | 11/2010 |
| EP | 2369511 | 9/2011 |
| EP | 2055606 | 2/2013 |
| EP | 2055584 | 5/2013 |
| EP | 2067679 | 8/2013 |
| JP | 2013-160522 A | 8/2013 |
| WO | WO2007067842 | 6/2007 |
| WO | WO2008112843 | 9/2008 |
| WO | WO2008125860 | 10/2008 |
| WO | WO2010081836 | 7/2010 |
| WO | WO2011066468 | 6/2011 |

OTHER PUBLICATIONS

File History for U.S. Appl. No. 14/178,572 as retrieved from the U.S. Patent and Trademark Office System dated Aug. 30, 2017, 227 pages.
File History for U.S. Appl. No. 14/255,091 as retrieved from the U.S. Patent and Trademark Office System dated Aug. 30, 2017, 360 pages.
File History for U.S. Appl. No. 14/255,235 as retrieved from the U.S. Patent and Trademark Office System dated Aug. 30, 2017, 249 pages.
Duoba, "Engine Design, Sizing and Operation in Hybrid Electric Vehicles", Presentation at University of Wisconsin-Madison, Jun. 8, 2011, 39 pages.
"Flywheel Hybrid Vehicle Delivers Up to 22.4% Fuel Economy Improvement", Prodrive, Sep. 12, 2011, 2 pages.
Fu et al., "Real-time Energy Management and Sensitivity Study for Hybrid Electric Vehicles", 2011 American Control Conference, San Francisco, Jun. 29-Jul. 1, 2011, pp. 2113-2118.
Geller, "Increased Understanding of Hybrid Vehicle Design Through Modeling, Simulation, and Optimization", 2010, 98 pages.

(56) References Cited

OTHER PUBLICATIONS

Karbowski et al., "PHEV Control Strategy Assessment Through Optimization", DOE Merit Review, Feb. 28, 2008, 9 pages.
Karbowski et al., "PHEV Control Strategy", 2009 DOE Hydrogen Program and Vehicle Technologies Annual Merit Review, May 19, 2009, 18 pages.
Kim, "Instantaneous Optimal Control for Hybrid Electrical Vehicles", DOE Update, Apr. 18, 2011, 21 pages.
Kim et al., "Comparison Between Rule-Based and Instantaneous Optimization for a Single-Mode", Power-Split HEV, 2011, 10 pages.
Mahapatra et al., "Model-Based Design for Hybrid Electric Vehicle Systems", The MathWorks, Inc., 2008, 10 pages.
Moawad et al., "Impact of Real World Drive Cycles on PHEV Fuel Efficiency and Cost for Different Powertrain and Battery Characteristics", EVS24 International Batter, Hybrid and Fuel Cell Electric Vehicle Symposium, May 13-16, 2009, pp. 1-10.
Pagerit et al., "Global Optimization to Real Time Control of HEV Power Flow: Example of a Fuel Cell Hybrid Vehicle", printed from the internet on Sep. 3, 2013, 13 pages.
Serrao et al., "Open Issues in Supervisory Control of Hybrid Electric Vehicles: A Unified Approach Using Optimal Control Methods", Oil & Gas Science and Technology, vol. 68, 2013, pp. 23-33.
Synopsys, "Hybrid and Electric Vehicle Design", printed from internet on Sep. 13, 2013, 3 pages.
Van Keulen et al., "Energy Management in Hybrid Electric Vehicles: Benefit of Prediction", Proceedings of the $6^{th}$ IFAC Symposium on Advances in Automotive Control, Jul. 12-14, 2010, Munich, Germany, pp. 1-6.
Van Kuelen et al., "Predictive Cruise Control in Hybrid Electric Vehicles", World Electric Vehicle Journal, vol. 3, May 2009, pp. 1-11.
Zhang et al., "Role of Terrain Preview in Energy Management of Hybrid Electric Vehicles", IEEE Transactions on Vehicular Technology, vol. 59, No. 3, Mar. 2010, pp. 1139-1147.

* cited by examiner

CONTROL SYSTEM FOR HYBRID VEHICLES WITH HIGH DEGREE OF HYBRIDIZATION

RELATED APPLICATIONS

This application is a continuation of U.S. Ser. No. 14/255,091 filed Apr. 17, 2014, which is incorporated herein by reference in its entirety.

SUMMARY

Some embodiments are directed to a hybrid vehicle having a fuel consuming engine and an energy storage device configured to supply power to drive the hybrid vehicle. The hybrid vehicle includes a prediction processor that predicts vehicle power demand to drive the vehicle, and a controller that automatically controls power flow from the engine and from the energy storage device to the driver train of the hybrid vehicle so as to provide power to drive the hybrid vehicle based on the predicted power demand. The predicted vehicle power demand is greater than a maximum power available from the engine at at least one point in time during operation of the hybrid vehicle.

Some embodiments involve control system for a hybrid vehicle driven by a fuel consuming engine and an energy storage device coupled to a drive train of the hybrid vehicle. The control system includes a prediction processor that predicts power demand to drive the hybrid vehicle based on changing conditions during operation of the hybrid vehicle. The control system also includes a power flow controller configured to automatically control power flow between at least one of the engine and the drive train, the energy storage device and the drive train, and the engine and the energy storage device, so as to provide the power to drive the vehicle based at least in part on the predicted power demand. The power demand to drive the vehicle is greater than a maximum power available from the engine at at least one point in time during operation of the hybrid vehicle.

Some embodiments involve a method for controlling power flow in a hybrid vehicle. The method includes predicting vehicle power demand to drive a hybrid vehicle by a fuel consuming engine and an energy storage device and controlling the power flow so as to provide power to drive the hybrid vehicle based on the predicted vehicle power demand. The predicted vehicle power demand is greater than a maximum power available from the engine at at least one point in time during operation of the vehicle.

DETAILED DESCRIPTION

Figure 1A:
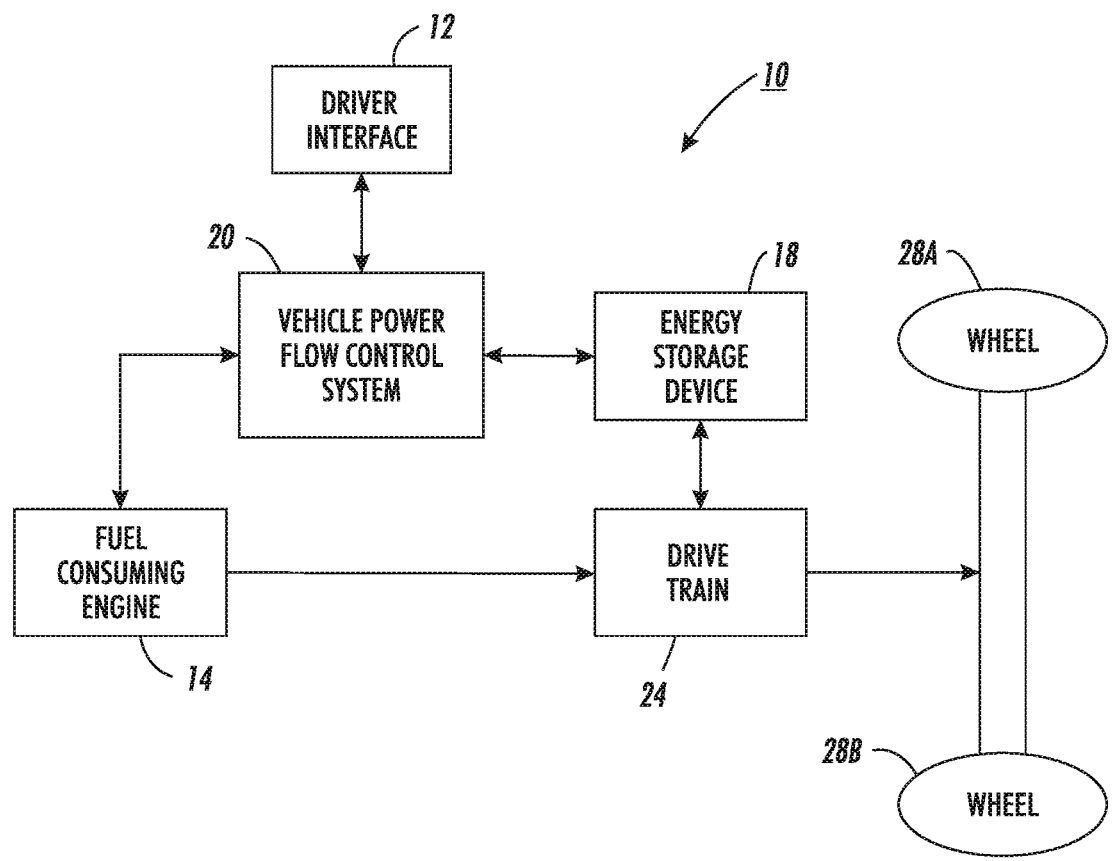
FIG. 1A is a block diagram representation of an embodiment of a hybrid vehicle.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

The present disclosure relates generally to hybrid vehicles with a "high Degree of Hybridization (herein further referred to as "high DoH vehicles"). A high DoH vehicle is a vehicle that includes fuel consuming engine and at least one other means to power the vehicle connected to an energy storage device, such that the engine by itself is incapable of delivering the maximum power demanded by the vehicle under typical usage. Typical usage is the collection of route profiles and driver behavior for which the vehicle is expected or designed to be used.

A high DOH vehicle is a vehicle with a relatively low-powered fueled engine relative to the vehicle's relatively high-powered energy storage device, as compared with conventional battery hybrid vehicles. While there is no exact definition of high DOH, for the purposes of this disclosure, the energy storage device may be considered to have the capability of providing at least half the power of the engine in some embodiments. In some embodiments, the fuel consuming engine may be incapable of providing the expected peak power demand of the vehicle based upon typical vehicle usage. In certain embodiments, the fuel consuming engine is configured to provide at least the mean but less than the peak power required to drive the high DoH vehicle during typical usage of the DoH vehicle. In some cases, the internal combustion engine when operated normally as it is expected or designed to operate is incapable of providing the expected peak power demand of the vehicle based upon expected vehicle use patterns.

Limiting the power output of the engine may allow it to operate within a maximum efficiency range as well as decrease the cost and mass of the engine. During normal operating conditions, the engine may have sufficient power to sustain a reasonable velocity on a relatively flat road, to climb a hill at a low velocity, and to accelerate at a relatively slow rate. Because the petroleum fueled engine in the high DOH vehicle is underpowered relative to the vehicle size and performance demands, the high DOH vehicle disclosed herein can use various energy storage devices to provide power By limiting the power output of the fuel consuming engine, the high DoH vehicle may be operated at higher efficiencies for relatively longer periods of time and/or distances. In some embodiments, the power output may be limited by using a relatively smaller fuel consuming engine, thereby decreasing the cost, harmful emissions, and the mass of the vehicle. During normal operating conditions, the fuel consuming engine may have sufficient power to sustain a reasonable velocity on a relatively flat road, to climb a hill at a low velocity, and to accelerate at a relatively slow rate. Because the fuel consuming engine in the high DoH vehicle is underpowered relative to the vehicle size and performance demands, the high DoH vehicle disclosed herein can use various energy storage devices to provide power to enable faster acceleration and enhanced performance.

In general, the figures illustrate various embodiments of high DoH vehicles as well as potential modes of vehicle operation. These modes include, for example, a series hybrid power mode with an energy storage device (e.g., mechanical or electrical energy storage device), a parallel hybrid power mode with an energy storage device, a power split series-parallel hybrid power mode with an energy storage device, and various through-the-road hybrid power modes. A control system controls the operating mode of various components of the high DoH vehicle. The control system may include control circuitry such as one or more microprocessors, computers, computer systems, discrete components, related software, algorithms, analytical simulation models for components, etc.

In various embodiments, the energy storage device may be a mechanical storage device, e.g., a flywheel or an electrical energy storage device, e.g., an ultra-capacitor (also called a super-capacitor) or an electrochemical battery pack. Flywheels and ultra-capacitors have high power density, and the same amount power can be obtained with a smaller, lighter, and/or less expensive unit than with a battery pack. However, high power density flywheels and ultra-capacitors have low energy density. For example, at full power, ultra-capacitors will typically discharge in seconds and flywheels will typically discharge in tens of seconds or minutes. This means they can provide sufficient power to the vehicle to enable it to accelerate effectively, to increase velocity or climb a hill, or to maintain a high velocity, but only for a limited duration. If a driver intends to accelerate when the energy storage element is depleted, the available power will be limited to the power of the fuel consuming engine, which may be insufficient as it is underpowered as discussed previously.

FIG. 1A is a block diagram representation of an embodiment of a high DoH vehicle 10. The high DoH vehicle 10 includes an optional driver interface 12, a fuel consuming engine 14, an energy storage device 18, a control system 20, a drive train 24, and a movement system, such as wheels 28a and 28b. The hybrid vehicle can include one or more charging systems for charging the energy storage device 18.

The fuel consuming engine 14 is configured to generate mechanical power for driving the vehicle 10. The fuel used for operating the fuel consuming engine 14 can include one or more of gasoline, diesel, methanol, ethanol, propane, hydrogen, methane (e.g., natural gas or from coal gasification), etc., including alternative fuels (fossil or otherwise) In certain embodiments, the fuel consuming engine 14 can be a multi-fuel engine. In some embodiments, the fuel consuming engine 14 can be an internal combustion engine.

The drive train 24, which may include a transmission, differential, and axle, provides mechanical energy to the wheels 28 (or other mechanical movement system) of the hybrid vehicle. The drive train 24 is coupled between the power-providing components (energy storage device 10 and engine 14) and the movement system, as shown in FIG. 1A. The drive train 24 can be coupled to one or both of the energy storage device 10 and the fuel consuming engine 14. For example, the drive train 24 may be arranged to operate the wheels 28a and 28b by transferring mechanical power to the wheels 28a, 28b using a differential (not shown in FIG. 1A). Wheels 28a and 28b can be coupled in a torque and power transfer relationship to the differential via one or more axles. Each wheel 28a and 28b can be a single wheel, such as the front passenger-side wheel and front driver-side wheel, or a set of wheels such as the front wheels and rear wheels of the high DoH vehicle. Similarly, the axle can be a portion of a single axle such as the front axle, or two or more axles. The differential permits rotation of opposing wheels, such as the left front wheel and the right front wheel, at different rotational speeds to facilitate turning and cornering without tire slippage. The differential can be a single differential or two or more differentials and may not be utilized in all embodiments.

Figure 1B:
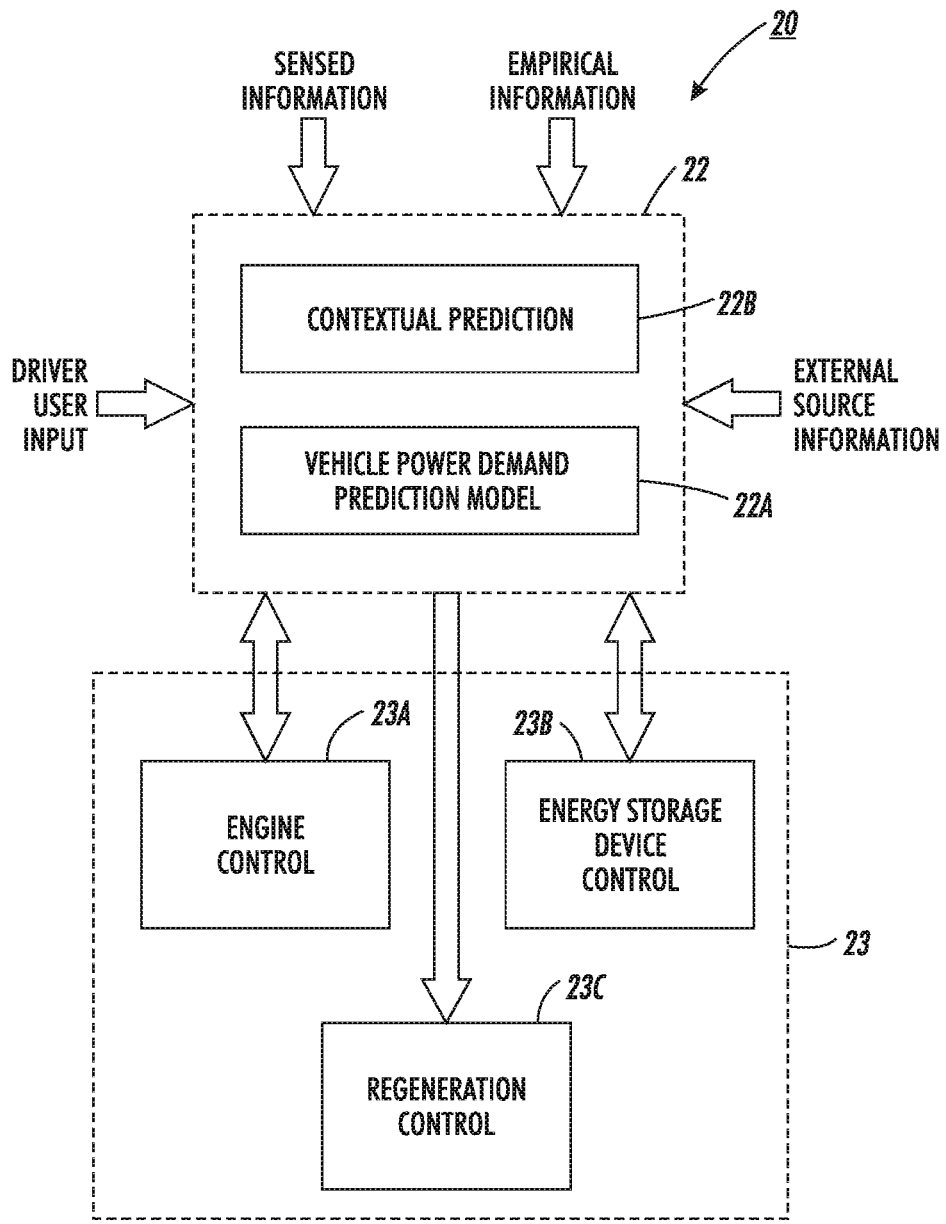
FIG. 1B is a more detailed block diagram representation of a vehicle power flow control system in accordance with some embodiments.

The control system 20 is coupled to the fuel consuming engine 14 and the energy storage device 18. The control system 20, shown in more detail in FIG. 1B, includes a prediction processor 22 and a power flow controller 23. The prediction processor 22 may include vehicle power demand prediction and contextual prediction subsystems 22a, 22b. The power flow controller 23 can include an engine controller 23a, configured to control the operation of the fuel consuming engine 14, and an energy storage device controller 23b, configured to control the operation of the energy storage device, and/or a regeneration controller 23c, configured to control the regeneration of the energy storage device. Operationally, the power flow controller 23 controls the operation of the energy storage device 10 and/or the engine 14, thereby controlling the mechanical power delivered to the drive train 24 in response to one or more signals received from the prediction processor 22. In some embodiments, the power flow controller 23 may control power flow between the engine 14 and the energy storage device 10 to control the charging of the energy storage device based on signals from the prediction processor 22.

In some implementations, the hybrid vehicle may include a regenerative brake or kinetic energy recovery system. In some implementations, the energy from the brakes is stored in the energy storage device. The controller 23 may control one or more regeneration processes, e.g., in advance of a predicted power demand.

According to some aspects, the controller 23 may control the regenerative processes by limiting power to drive the vehicle based on limitations of current or power of the electronics (or other vehicle components). In advance of a relatively high predicted power demand, the controller 23 may limit the power drawn from the energy storage device, or may provide additional power from the engine to charge the energy storage device. Another example of controlling the regenerative processes involves limiting power from the brakes so that the engine can deliver the power for braking instead, thereby operating the vehicle more efficiently. This may happen in the case of an engine that operates better when its speed or torque or power is not changed too much or too rapidly.

In some scenarios, it may not be necessary to charge the energy storage from the brakes. For example, the wheel(s) and/or the powered axle(s) may be directly loaded by a motor-generator set to produce electricity or by a coupled flywheel. Thus, the braking action may be split up between the regeneration process and the actual brakes. In some cases, kinetic energy dissipated through the brakes is lost. The controller can be configured to determine how much energy to recover and/or how much energy to bleed through the brakes depending on the vehicle speed, the driver's brake pedal input, the driver's expectation of braking response, and/or radar data of obstacles ahead, and/or other variables. For example, the controller may include the charge/energy state of the energy storage device and/or the predicted power demand to the list of variables to consider to control the regenerative process.

In some implementations, the prediction processor 22, based on GPS data and/or past driver habits, may predict locations or time intervals in which braking will occur such that energy from regenerative braking can be provided to the energy storage device at these locations or during these time intervals. In these situations, the controller may draw additional power from the energy storage device, or limit the power delivered to the energy storage device from the engine, so that the predicted power from the regenerative braking system can be more fully utilized.

The prediction processor 22 may make predictions of vehicle power demand and/or other operational parameters based on historical information, empirical information, sensed information, driver-input, crowd-sourced information and/or other information. In some embodiments, the prediction of vehicle power demand can be made based on a driver's historical habits or patterns when operating the vehicle. In some embodiments, the prediction of vehicle power demand can be made based in part on the contextual operating conditions of the vehicle, wherein the contextual operating conditions can include both current operating conditions and historical operating conditions. The prediction processor 22 may include circuitry 22*b* capable of providing contextual prediction of the operating conditions of the vehicle at a time in the future, e.g., within a moving window of time or distance. As one example of contextual prediction, the contextual prediction circuitry 22*b* may predict the route that the driver will choose based on previous routes that the driver has taken in the past. As another example, the contextual prediction circuitry 22*b* may predict degradation of engine components based on a degradation model.

The prediction information generated by the contextual prediction circuitry informs the vehicle power demand prediction circuitry 22*a* which operates using one or more vehicle power demand prediction models. For example, the vehicle power demand prediction models may be embodied as modeling equation(s) and/or look-up table(s). The vehicle power demand prediction models may operate on information from various sources, such as information predicted by the contextual prediction subsystem, driver-input information, empirical information, sensed information, and/or information provided by sources external to the hybrid vehicle (e.g., crowd-sourced information, weather information, traffic information, location information) to predict power demand of the hybrid vehicle.

In a high DoH vehicle, the predicted vehicle power demand may be greater than the maximum power available from the engine at at least one point in time during the operation of the hybrid vehicle. In various scenarios, the predicted vehicle power demand may be greater than the maximum power available from the energy storage device at at least one point in time during the operation of the hybrid vehicle. In some scenarios, the predicted vehicle power demand may be greater than the maximum power available from the energy storage device and the engine operating together at at least one point in time during the operation of the hybrid vehicle. When the predicted vehicle power demand is greater than the power available from the engine, the energy storage device or both, the controller may take various actions to ensure that power will be available, such as altering the power flows from the engine and/or energy storage device so that the needed power will be available at the future point in time and/or suggesting alternate routes to the driver that will allow power to be available to operate the vehicle.

In some embodiments, the control system 20 directs power either from the fuel consuming engine 14 or from the energy storage device 18 to the drive train 24 based on the vehicle's power demand as determined by the prediction processor 22. In some implementations, the power flow control system 20 is configured to use the mechanical power from the fuel consuming engine 14 to operate a charging system for the energy storage device 18. In some instances, the power flow controller 20 controls the flow of mechanical power (e.g., regenerative braking) to the charging system for the energy storage device 18. In some embodiments, the vehicle 10 includes one or more additional or alternative systems for charging the energy storage device 18.

As described elsewhere, the prediction processor 22 determines and/or predicts the operating parameters for the vehicle 10. In some embodiments, the prediction processor 22 is disposed within the hybrid vehicle 10. In certain embodiments, the prediction processor 22 can be disposed at a location remote from the vehicle 10, e.g., at a data center located physically distant from the vehicle 10, and can be configured to communicate with the power flow control system 20 via a wireless communication link. The prediction processor 22 is configured to predict the vehicle power demand based on a number of information sources, including driver input parameters provided through the driver interface 12, a plurality of known engine characteristics (e.g., engine configuration and/or known static or long-term engine characteristics), sensed engine conditions (e.g., dynamically changing engine characteristics, friction, state of the engine, state of the energy storage device, etc.), and sensed or externally acquired information (e.g., vehicle location, topography, weather, traffic, etc.) to determine predicted power requirements.

In the interest of brevity, additional mechanical and/or electrical devices, components, systems, etc. for operating the vehicle 10, as are well known in the art, are neither illustrated in the figures nor described herein. For instance, an engagement mechanism such as a clutch, automatic transmission, or other torque transferring device used for diverting mechanical power to and from the drive train 24 are not illustrated or described.

Figure 1C:
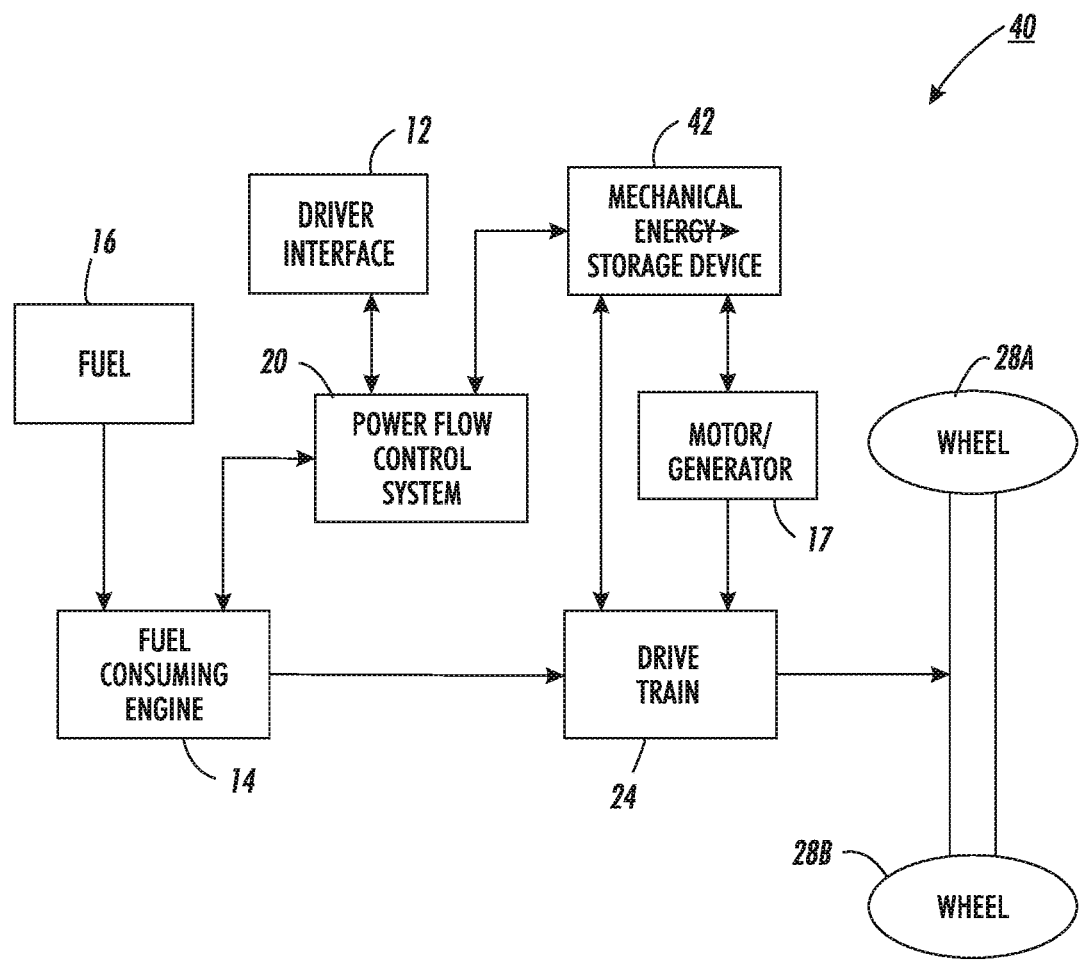
FIG. 1C is a block diagram representation of the hybrid vehicle of FIG. 1A having a mechanical energy storage device.

FIG. 1C is a block diagram representation of an embodiment of a high DoH vehicle 40, wherein the energy storage device 18 of the high DoH vehicle 10 is a mechanical energy storage device 42. In some embodiments of the high DoH vehicle 40, the mechanical energy storage device 42 includes one or more flywheels configured to produce between 10 kWatts and 200 kWatts of mechanical power for driving the vehicle 40.

In some implementations, the mechanical energy storage device 42 is coupled to an electric motor/generator 17. Mechanical energy from the storage device 42 is converted to electricity by the electric generator portion of the motor/generator and used to power the motor 17. The motor 17 is coupled to provide power to the drive train 24. In some implementations the engine 14 drives the motor/generator 17 to charge the energy storage device 42. In some configurations, the motor/generator 17 serves as an electric transmission for the mechanical energy storage device 42, e.g., flywheel.

Figure 1D:
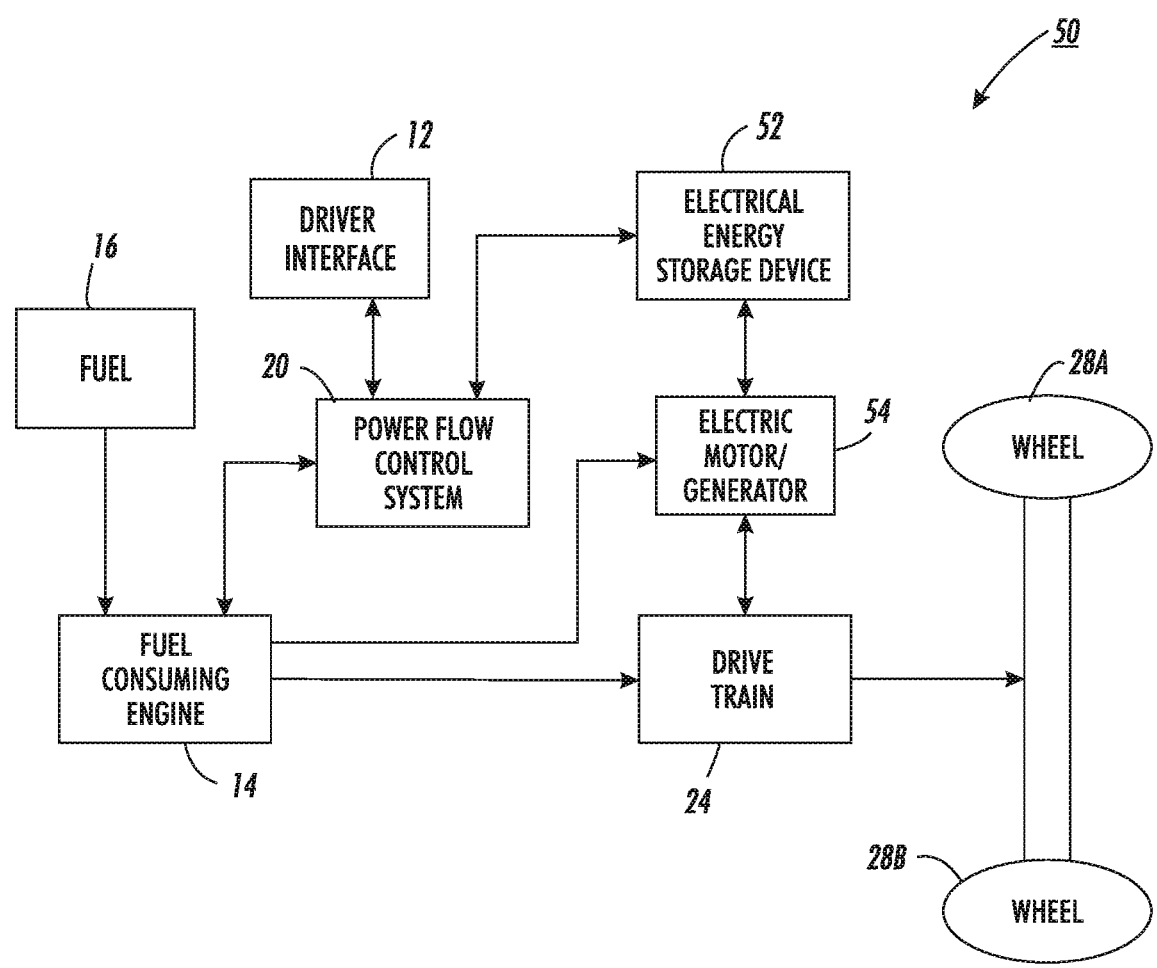
FIG. 1D is a block diagram representation of the hybrid vehicle of FIG. 1A having an electrical energy storage device.

FIG. 1D is a block diagram representation of an embodiment of a high DoH vehicle 50, wherein the energy storage device 18 of the high DoH vehicle 10 is an electrical energy storage device 52 is configured to operate an electric motor 54 coupled thereto. In some embodiments, the electrical storage device 52 is one or more of a re-chargeable battery pack, ultra-capacitor, fuel cell, or other re-chargeable electrical energy device(s). In certain embodiments, the electrical motor 54 is configured to generate mechanical power for driving the vehicle 50. In some embodiments, the electrical motor 54 is further configured as an electrical generator for converting input mechanical power to electrical power for charging (e.g., storage) the electrical energy storage device 52. The engine 14 may be arranged to drive a generator (which may be the same component as the motor (e.g. a motor/generator 54) to charge the energy storage device 52. In some embodiments of vehicle 50, a generator is configured to convert input mechanical power to electrical power for charging the electrical energy storage device 52 is separate and distinct from the electrical motor. In certain embodiments, at least a portion of the mechanical power required for operating the electrical generator is provided by the fuel consuming engine 14. In some embodiments, at least a portion of the mechanical power required for operating the electrical generator is derived from regenerative braking of the vehicle 50.

The electrical motor/generator 54 can be any of one or more devices, components, systems, etc. For instance, the motor and/or generator can be one or more of an AC device, a DC device (e.g., permanent magnet), switched reluctance device, repulsion-induction device, an induction device, etc.

Figure 2:
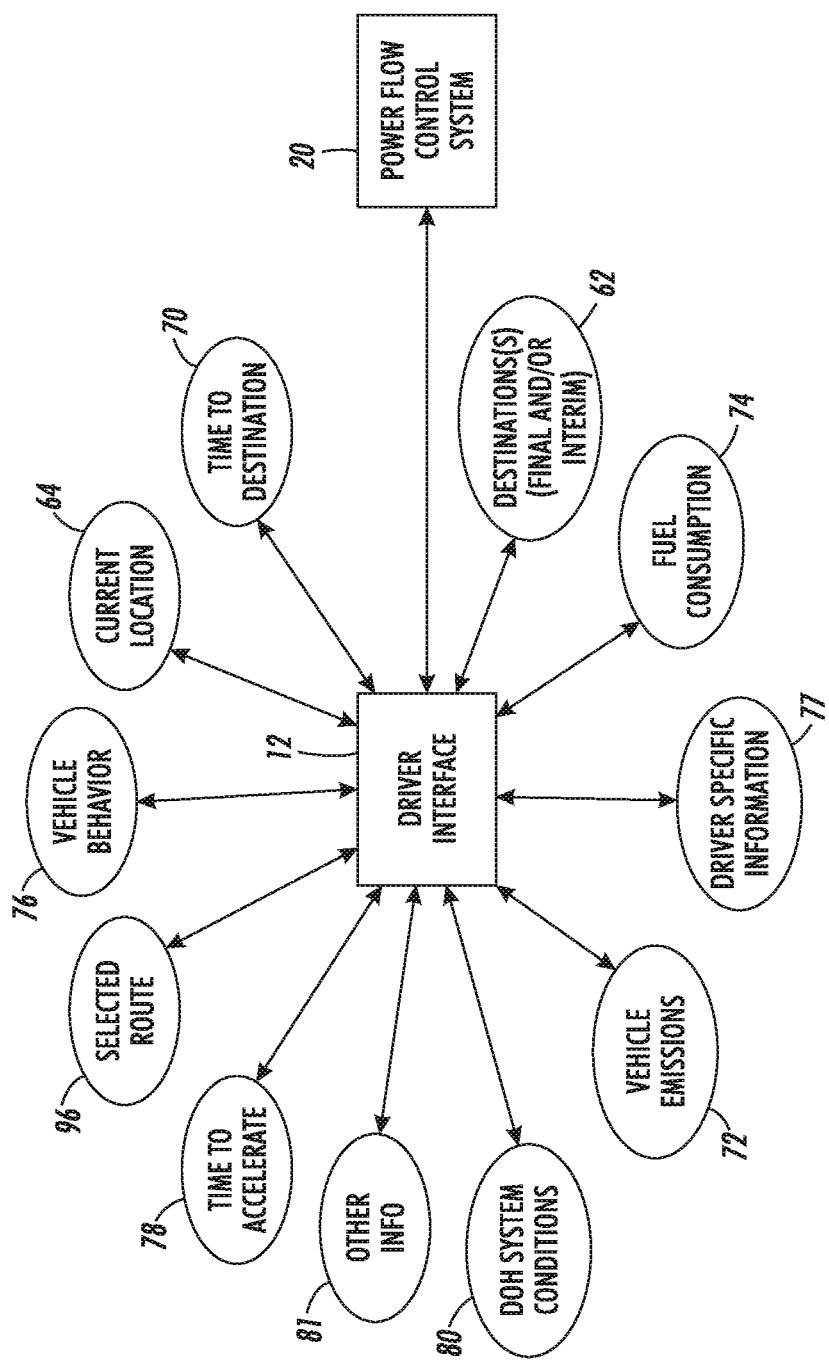
FIG. 2 illustrates an embodiment of a driver interface for a hybrid vehicle.
Figure 3:
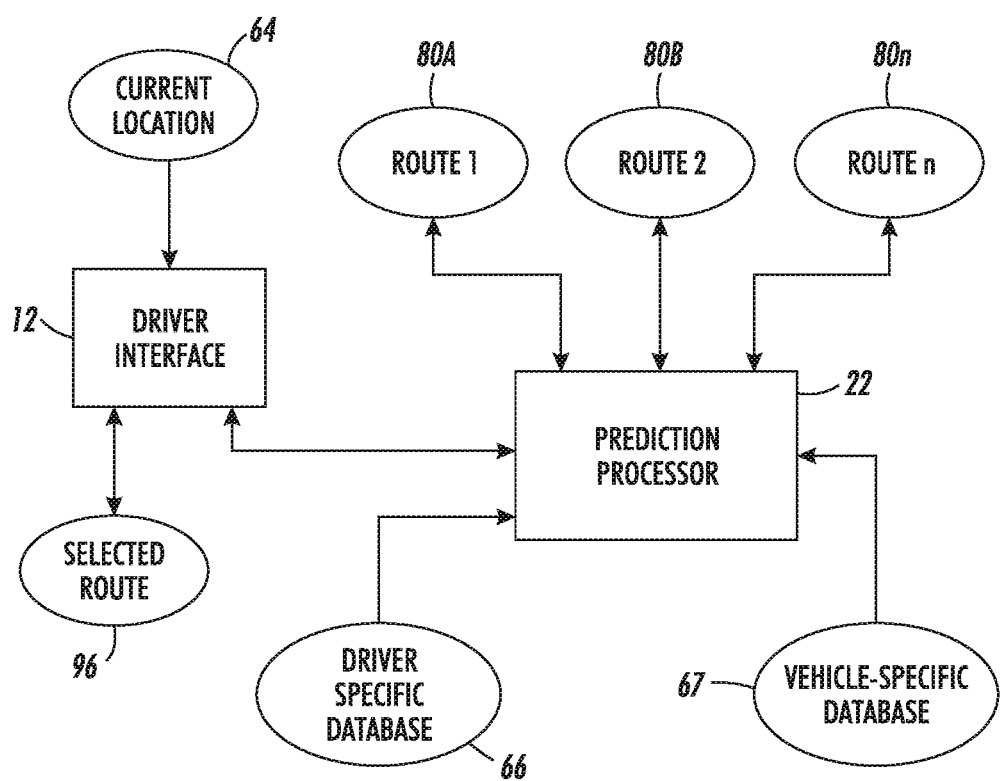
FIG. 3 illustrates an embodiment of a prediction processor for predicting multiple potential routes for the hybrid vehicle of FIGS. 1A-1D.
Figure 4:
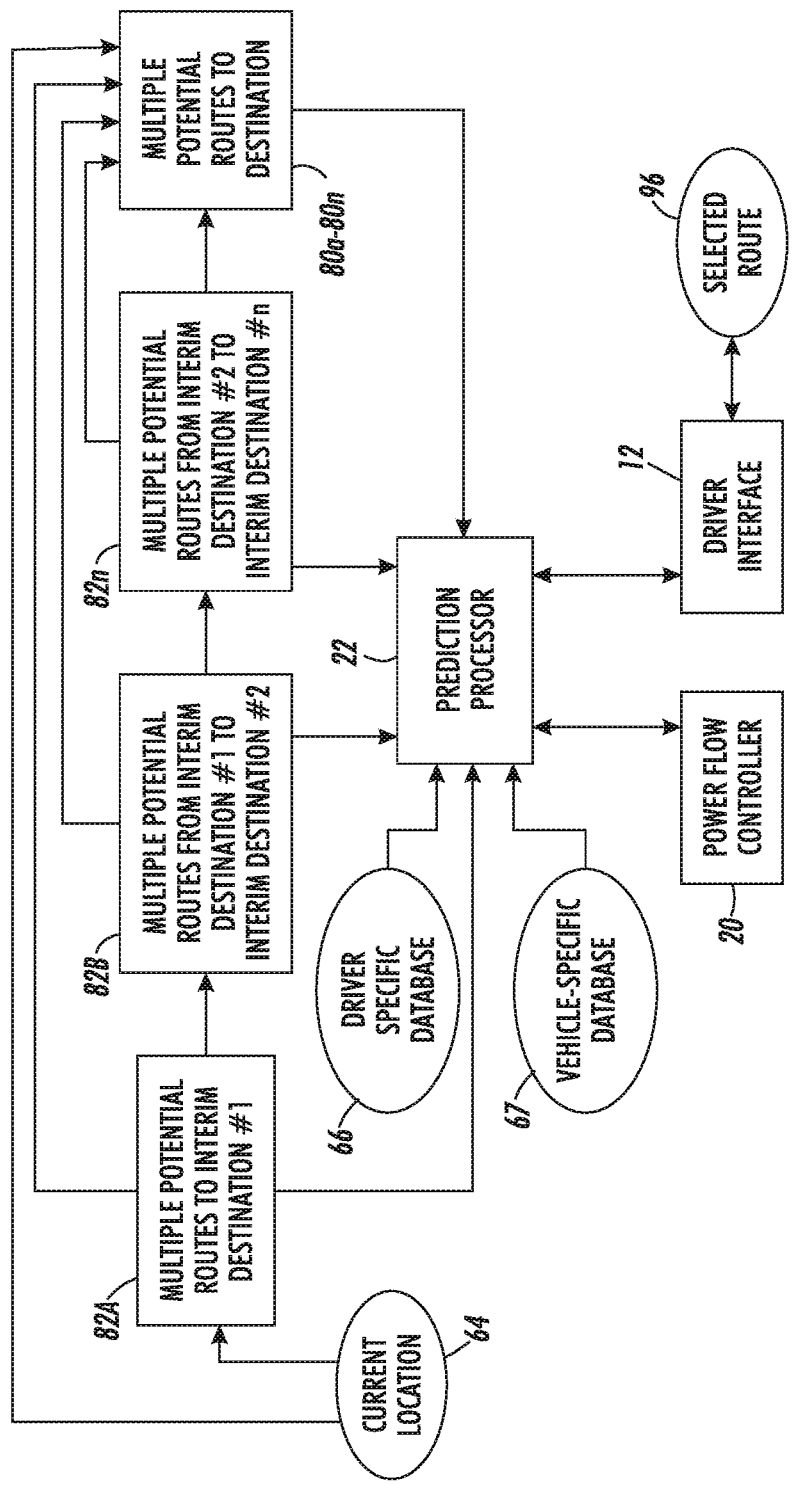
FIG. 4 illustrates another embodiment of a prediction processor for predicting multiple potential routes for the hybrid vehicle of FIGS. 1A-1D.
Figure 5:
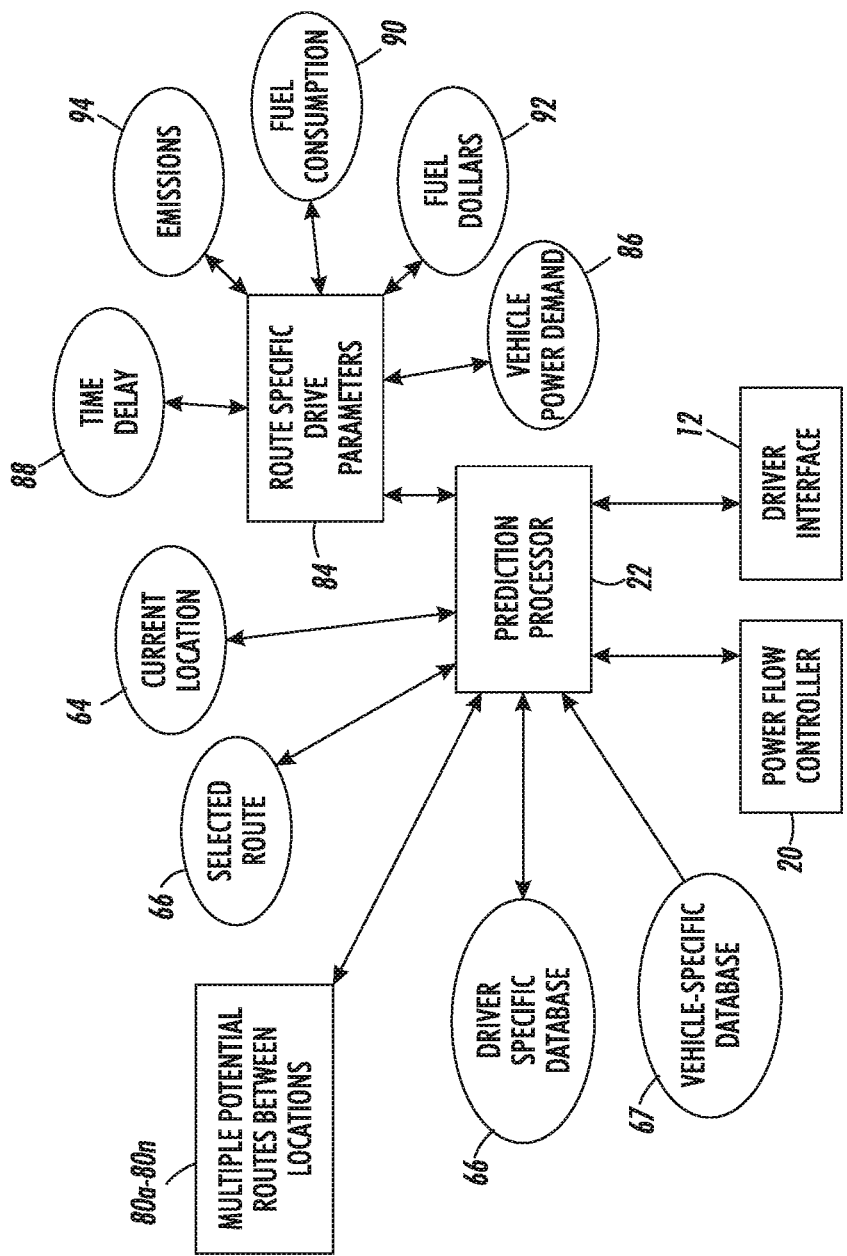
FIG. 5 illustrates an embodiment of a prediction processor configured for predicting multiple potential routes and route-specific drive parameters for the hybrid vehicle of FIGS. 1A-1D.

FIG. 2 illustrates an embodiment of a driver interface 12 and exemplary functions of the driver interface 12 in accordance with some embodiments of the high DoH vehicle (such as vehicles 10, 40, and 50). The driver interface 12 is designed for interaction with a driver and can be configured to both obtain information from and display information to the driver of the vehicle 10. The driver interface 12 may be configured to prompt the driver to enter certain information, to provide the driver with selectable options, and/or to relay information to the driver. The power flow control system 20 receives the driver-specified input 79, e.g., driver-provided information and/or selections made by the driver via the driver interface 12 and may propose routes, make predictions and/or execute tasks based on the driver input information. As shown in FIG. 2, an exemplary and non-limiting list of information that the driver interface 12 may input or output includes selected routes 96, expected or actual vehicle behavior 76, current location of the vehicle 64, time to destination 70, destination location 62, fuel consumption 74 (e.g., instantaneous or average), vehicle emissions 72 (e.g. instantaneous or average), other DoH conditions 80, driver-specific information 79, and/or any other information 81, e.g., driver or vehicle parameter values, or conditions related to operation of the hybrid vehicle.

For instance, the driver interface 12 can be used by the driver to specify a destination 62. In some embodiments, the destination 62 can include a final destination and/or a plurality of interim destinations between a current location 64 of the vehicle 10 and the final destination. As illustrated in FIGS. 2-6, information from the driver interface 12 and/or from other sources can be used to make predictions about operation of the vehicle. In some embodiments, the vehicle 10 includes one or more historical databases 66, 67 e.g. a driver and/or vehicle specific database, from which the contextual prediction circuitry of the prediction processor 22 can surmise (e.g., predict) contextual operating conditions of the vehicle, such as the destination 62 and/or other contextual information. For instance, in certain embodiments, the driver's identity and the time of day can be used to predict the driver's interim and/or final destination. For example, if travel is during the morning hours on a weekday, the prediction processor can assume the driver is traveling to work. In addition, or in the alternative, the driver's identity and the current location 64 can be used to predict the driver's destination. In some embodiments, the driver-specific historical database 66 can be on-board the vehicle 10. In certain embodiments, the driver-specific historical database 66 can be at a location remote from the vehicle 10, and can be configured to communicate with the prediction processor 22 via a wireless communication link, such as a cellular communications link. In some embodiments, a GPS interface 68 can be used to determine the current location 64 of the vehicle 10.

In some embodiments, the driver interface 12 can be used for specifying and/or ranking one or more driver-specific drive parameters. The rankings indicated the importance attributed by the driver to each of the driver-specific drive parameters. Exemplary driver-specific drive parameters can include, and are not limited to, one or more of a time to destination 70, acceptable emissions to destination 72, acceptable fuel consumption to destination 74, vehicle behavior 76, and time to accelerate 78. In some embodiments, the time to destination 70 can include one or more of a time at which the driver wants to arrive at the destination and/or the time to commute (e.g., duration). In certain embodiments, the one or more driver-specific drive parameters can be stored in the driver-specific historical database 66. In some implementations, the driver may not be required to specify the drive parameters. In some embodiments, driver-changeable default (e.g., factory set or previously set by the driver) drive parameters can be included in the historical database 66. In certain embodiments, the driver can specify and/or change the one or more drive parameters as and when desired through the driver interface 12.

In some embodiments, the driver interface may be configured to prompt the driver to enter rank information for one or more drive parameters. The ranked drive parameters are used to suggest a one or more routes that are displayed on the driver interface. The ranked driver parameters may alternatively or additionally be used by the prediction processor to predict power demand and/or by the controller to control the power flow to drive the hybrid vehicle. In various embodiments, the controller may be configured to automatically control power flow between at least one of the engine and the drive train, the energy storage device and the drive train, and the engine and the energy storage device, so as to provide the power to drive the vehicle. Control of the power flow is based at least in part on the predicted power demand.

In some embodiments, vehicle behavior 76 relates to how the driver expects the vehicle to behave. Thus, vehicle behavior 76 can be a "learned" driver-specific drive parameter. For instance, the driver's driving habits can be monitored, either continuously or over one or more time intervals, and the driver habits may be included or updated in the historical database 66. In some embodiments, information about the vehicle behavior 76 can include quantitative and/or qualitative driver-specific data and/or profiles such as acceleration habits (e.g., "jack rabbit", gradual, etc.), deceleration habits (e.g., gradual, abrupt, etc.), among others. The vehicle behavior 76 can also include driver expectations of the vehicle's drivability or other parameters such as a desired or expected "smoothness" of the ride, responsiveness, time to accelerate 78. The vehicle behavior 76 can also include driver-specified operating characteristics of the vehicle such as driver-specified vehicle emissions, driver-specified fuel consumption, among others.

In some embodiments, the contextual prediction portion of the prediction processor 22 is configured to determine multiple potential routes 80a-80n that can be taken by the driver between the current location 64 and the destination 62. In certain embodiments, the prediction processor 22 is configured to determine the multiple potential routes 80a-80n between the current location 64 and each of a plurality of interim destinations 82a-82n that can be taken by the driver. In some embodiments, the multiple potential routes 80a-80n can be predicted by the prediction processor based on the current location 64, the destination 62, and the one or more driver-specific drive parameters associated with each of the multiple potential routes 80a-80n. The interim destinations 82a-82n can be predicted based on a map of the road system. For example, an interim destination may be the next intersection. In certain embodiments, the prediction processor 22 is configured to avoid routes having a grade or incline greater than a predefined grade. As such, the multiple potential routes 80a-80n can include at least one potential route having a more gradual elevation increase compared to other potential routes.

The multiple potential routes 80a-80n can be displayed on the driver interface 12. In some embodiments, the route information can be displayed on the driver interface 12 along with one or more route-specific drive parameters 84 as determined by the prediction processor 22 for each of the multiple potential routes 80a-80n. In certain embodiments, the route-specific drive parameters 84 can be the same as the driver-specific drive parameters, albeit displayed with route specific information. Exemplary route-specific drive parameters 84 can include, and are not limited to, one or more of a vehicle power demand 86, a time delay 88 in reaching the destination (e.g., due to traffic, weather, road construction, etc.), increase (or decrease) in fuel consumption 90, fuel dollars (e.g. fuel dollars saved or increased relative to other routes) 92, and increase (or decrease) in vehicle emissions 94 relative to other routes. In some embodiments, the drive parameters 84 may include those derived from instantaneous conditions such as, but not limited to, instantaneous power and predicted cumulative time when the power demand is not met. The route-specific drive parameters 84 can be displayed in absolute values, as values relative to those of other potential routes, and/or as deviation from the driver specified drive parameters (e.g., as differential values).

In some embodiments, the driver can select a route 96 from the multiple potential routes 80a-80n displayed on the driver interface 12. In certain embodiments, the prediction processor 22 can predict that the driver will want to travel on one of the routes from the multiple potential routes 80a-80n for which there is a "close match" between the route specific drive parameters 84 and the driver-specific drive parameters. In some embodiments, the driver can specify or select a route 96 different from the multiple potential routes 80a-80n displayed on the driver interface 12. For instance, the selected (specified by the user, or predicted by the prediction processor) route 96 may be a scenic route the driver wishes to travel on.

In some embodiments, the prediction processor 22 is configured to predict the vehicle power demand 86 based on the information about the driver selected route 96. In certain embodiments, the prediction processor 22 is configured to predict the vehicle power demand 86 based on the driver provided information about the final destination. In some embodiments, the prediction processor 22 is configured to predict the vehicle power demand 86 without any driver provided or selected information of the route and/or the destination. For instance, in certain embodiments, the prediction processor 22 is configured to predict the vehicle power demand 86 for a moving sequence of time intervals during the operation of the vehicle 10. In some embodiments, prediction processor 22 is configured to predict the vehicle power demand 86 that will be needed to reach a number of interim locations for interim routes during the operation of the vehicle 10.

Figure 6:
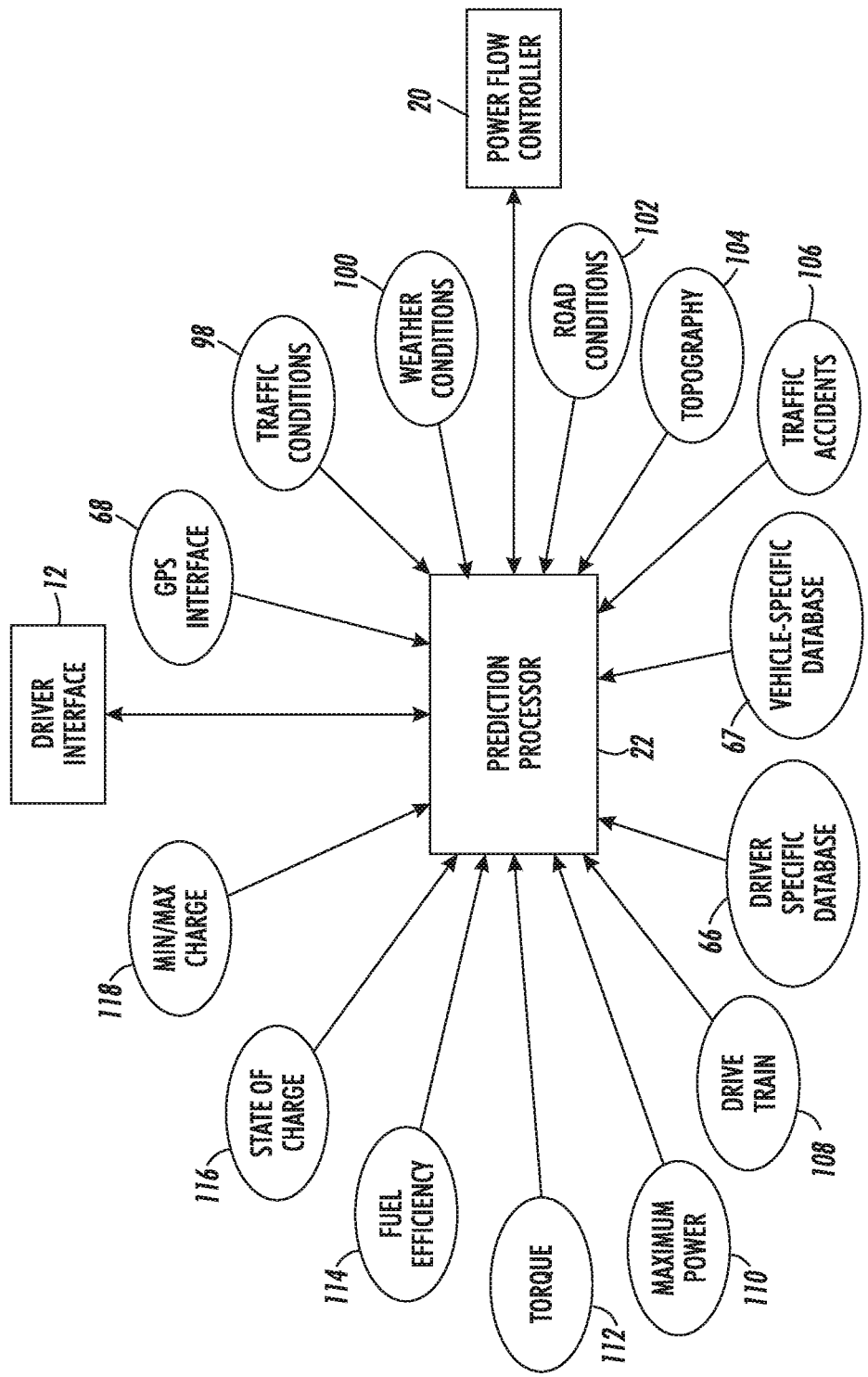
FIG. 6 illustrates an embodiment of data used by the prediction processor of FIG. 5.

FIG. 6 illustrates an embodiment of vehicle 10, wherein the prediction processor 22 is configured to predict the vehicle power demand 86 based on the contextual operating conditions of the vehicle. the contextual operating conditions can include, and are not limited to, one or more of external conditions (conditions external to the vehicle), internal conditions (conditions internal to the vehicle), sensed conditions (external or internal), predicted conditions (external or internal), and the previously described driver-specified conditions such as drive parameters and route or destination information. In some embodiments, the external conditions can include one or more of traffic 98, GPS information 68, weather 100, road conditions 102, and topography 104. The sensed conditions can include traffic 98, weather 100, road conditions 102, traffic accidents 106, engine conditions, energy storage device conditions, and drive train conditions 108. The sensed engine conditions can include the maximum power available 110, torque 112, engine speed, and fuel efficiency 114. The sensed energy storage device conditions can include the state of charge 116, available power, and the minimum and maximum charge (e.g., storage capacity) 118 of the energy storage device. The predicted conditions can include weather 100, route 94, traffic, destination 62, and component degradation.

Figure 7:
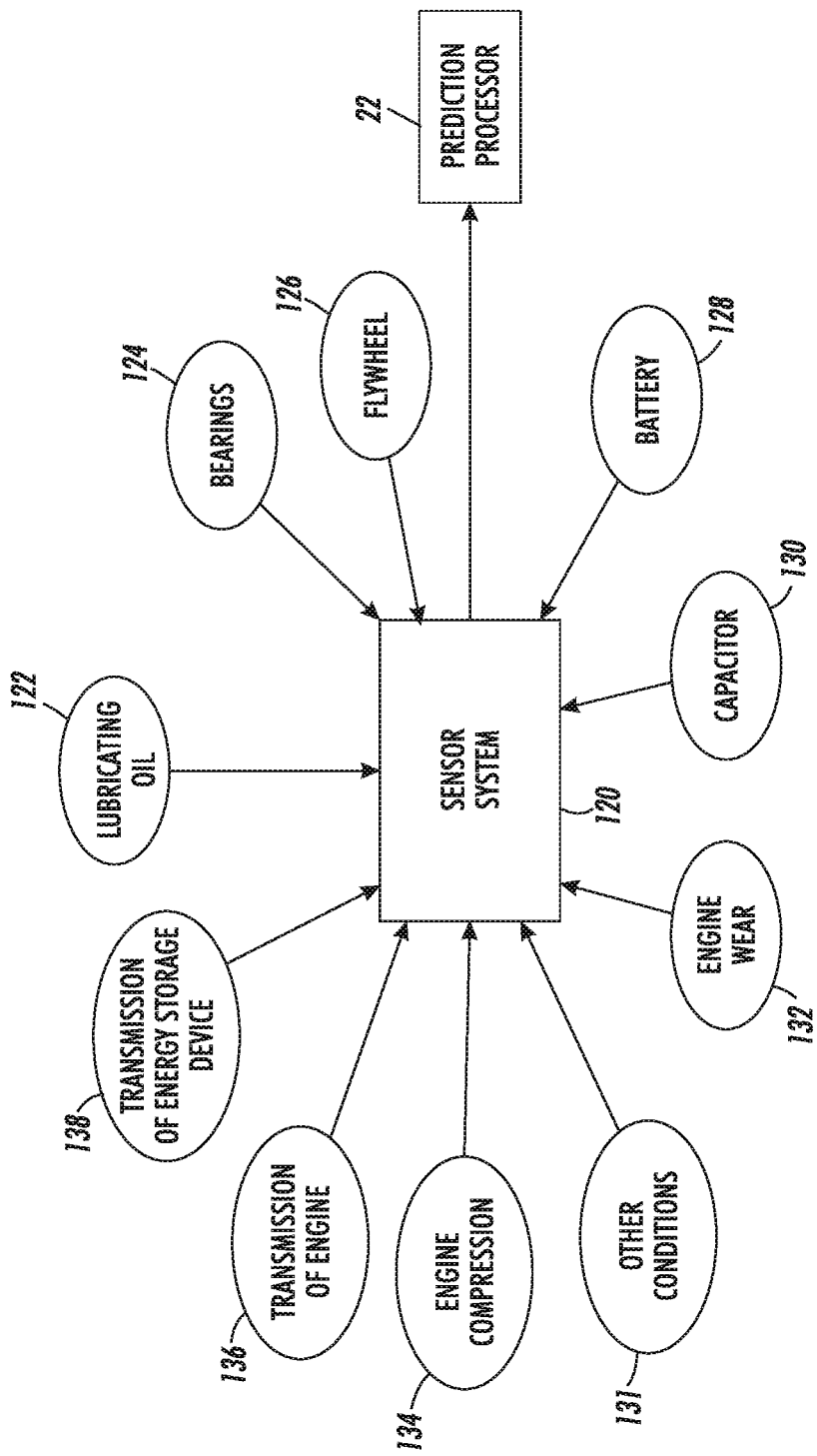
FIG. 7 illustrates an embodiment of a sensor system for the prediction processor of FIG. 5.

FIG. 7 illustrates an embodiment of the vehicle 10 having a sensor system 120 coupled to the prediction processor 22, wherein the sensor system 120 is configured to sense one or more conditions, and the prediction processor 22 is configured to predict the vehicle power demand 86 based on the one or more sensed conditions. In some embodiments, the one or more sensed vehicle parameters can include sensing conditions indicating the degradation of one or more of the lubricating oil 122, bearings 124, the flywheel 126, the battery 128, the capacitor 130, engine wear 132, engine compression 134, transmission of the engine 136, transmission of the energy storage device 138, and/or various other conditions 131 internal or external to the vehicle.

In some embodiments, the prediction processor 22 is configured to predict changes in one or more vehicle components and accordingly predict changes in the vehicle power demand 86 based on the predicted changes in the one or more vehicle components. For instance, the predicted change in a component can be based on one or more of the age of the component, distance traveled, number of rotations or cycles, etc. In certain embodiments, the prediction processor 22 is configured to predict changes based on one or more degradation models, wherein the degradation model is characterized by an equation and/or a look-up table. In some embodiments, the degradation model is adaptable based on the one or more sensed conditions. In certain embodiments, the prediction processor 22 can include one or more mathematical models representative of each component of the hybrid vehicle 10. For instance, the prediction processor 22 can include one or more mathematical models for the fuel consuming engine 14 and/or of the energy storage device 18. The prediction processor 22 can be configured to determine or predict the vehicle power demand 86 based on the one or more mathematical models. In certain embodiments, the prediction processor 22 is configured revise the mathematical models for the one or more vehicle components based on sensed and/or predicted changes in the performance of the components.

In certain embodiments, the prediction processor 22 is configured to predict the traffic conditions 98, and to predict the vehicle power demand 86 based on the predicted traffic conditions or changes in the traffic conditions 98. For instance, the prediction processor 22 can be configured to predict the traffic conditions based on the time of day and/or the selected route 96. The prediction processor 22 can include a linear or a non-linear autoregressive model to account for differences in the predicted and the actual time evolution of the traffic for predicting the vehicle power demand 86.

In some embodiments, the prediction processor 22 can be configured to predict the vehicle power demand 86 in real-time. As such, the prediction processor 22 can be configured to propose an alternate route to the driver based on real-time conditions, e.g. real-time weather, road conditions, and/or traffic conditions. The proposed route can be displayed on the driver interface 12, and the driver can be permitted to accept or reject the proposed alternate route. The prediction processor 22 can execute the proposed alternate route if accepted by the driver. In certain embodiments, the prediction processor 22 can be configured to maximize energy usage from the energy storage device 18 and minimize energy usage by the fuel consuming engine 14.

In some embodiments, the prediction processor 22 can be configured to use a Monte Carlo algorithm in a model-predictive control framework to predict the vehicle power demand 86. In certain embodiments, the prediction processor 22 can be configured to use stochastic programming in a model-predictive control framework to predict the vehicle power demand 86. As will be apparent to one skilled in the art, stochastic programming can include a class of algorithms known as Mathematical Programming or Mathematical Optimization algorithms. For instance, such algorithms can include integer programming, linear programming, and nonlinear programming. In some embodiments, the prediction processor 22 includes an adaptive optimization control algorithm for operating the vehicle, wherein one or more control parameters can be revised using real-time sensed or predicted data. In some embodiments, the real-time sensed data may include the detection of engine wear by detecting debris particles in the hydraulic and lubrication systems. For instance, the vehicle may include an early warning system having one or more sensors for monitoring oil cleanliness for indications of bearings and gear damage in transmission systems and/or of engine wear. In certain embodiments, the sensed data may be used for calibrating wear models for predicting component degradation such as abrasive wear in piston rings and bore that can reduce the output power.

In some embodiments, the vehicle power flow control system disclosed herein provides specified, e.g., optimized, power flows such that fuel consumption and/or harmful emissions or some combination of the these (or other variables) is reduced, e.g., minimized, subject to the constraint that sufficient acceleration power is provided to the greatest extent possible.

The control system predicts emissions and or fuel consumption based on an internal model that accounts for the efficiency and emissions production of the engine in different operating regimes (e.g., an engine map based on engine speed and torque). For a given engine output power, these values of fuel consumption and/or emissions can be reduced by, for example, striving to operate the engine at its most efficient operating point.

The power flow control system attempts to provide sufficient acceleration power by predicting when and how much acceleration is likely to be required and providing sufficient energy in the energy storage device at that time. This is accomplished by controlling the charge and discharge of the energy storage element along the energy flows, e.g., from the engine to the movement system, from the engine to the energy storage device, from the energy storage device to the movement system, and/or from the regeneration system, e.g., regenerative braking, to the energy storage device based on a predictive, statistical analysis of the driving situation.

Several techniques can be used as a basis for this prediction. For example, the vehicle, driver, or control regime can be selected from a set of categories associated with a vehicle type (e.g., minivan, small sedan, etc.) and general driving situation (e.g., city errands, commuting, etc.). Each category is associated with a typical "drive cycle", or set of velocities as a function of time, which are derived from stochastic combinations of typical or average drive cycles in that situation. The drive cycle can then be used to approximate how likely a certain amount of acceleration is to be required based on current and past velocity.

The driving history of the vehicle, the driver, or the vehicle in combination with the driver, can be used to predict likely acceleration demands. For example, the driver's historical rate of acceleration after a stop or entering a limited access highway can be incorporated into a historical database and used to predict future driving characteristics of the driver. The driver-specific information can be enhanced with mapping or GPS data and/or weather conditions, if available.

If route, mapping, or GPS data, possibly including grade/elevation, are available, the power flow control system can use them to predict likely acceleration needs. For example, given the route and the current vehicle position, requirements for accelerating onto a freeway or up a hill can be predicted. In a specific example, if the vehicle is approaching a freeway entrance, the control system may calculate an increased likelihood that acceleration will be required. This can be further augmented by real-time and/or historic traffic or road speed data. In one variation, the control system can be used as a component to aid in enhancing or optimizing a route recommendation. For example, routes that avoid long climbs may be preferred for a high DoH vehicle. As another example, routes that substitute longer, more gradual climbs may be preferable over shorter, steeper climbs.

The algorithm of the control system prediction processor uses one or a combination of the above sets of inputs to determine the acceleration needs of the high DoH vehicle, calculates the required stored energy, and then directs the energy flows that will provide a specified or optimal fuel consumption or emissions subject to that requirement.

Depending on the drive train configuration, other control variables related to the optimization variables can be output by the control system. For example, in a vehicle with a continuously variable transmission, the engine operating point (i.e., engine speed), can be controlled to maximize engine efficiency.

Power flow control can be implemented over a full route or a shorter time (or distance) window, e.g., a moving time or distance window. Various prediction and optimization routines can be used to implement the power flow control processes. In one variation, the vehicle power demand prediction and power flow control model operates with time as the independent variable, and takes as input a velocity-over-distance profile (for example, corresponding to a computer-generated route). In this variation, the model computes the traction power required for the vehicle to achieve the target velocity at a given di stance. If predicted available power (which may be physically limited by available engine and/or energy storage device power, or limited by the control system) is less than the power needed to reach the target velocity, the velocity corresponding to the available power is computed (for example, based on inverting the dynamometer load equation, with acceleration linearized according to the time step of the simulation), and the resulting reduced distance traveled is calculated. At the next time step, this distance is used with the velocity-over-distance profile to compute the desired velocity. For a velocity-time profile to be used with such a model, the velocity-distance profile can be pre-computed from the velocity-time profile via integration and resampling. The prediction algorithm could be operated in real time by the controller or pre-executed when the route is computed.

As an illustrative example, consider a portion of route in which the vehicle is expected to accelerate from stopped to 60 mph over 10 seconds. This corresponds to an acceleration rate of 6 mph/s and a distance traveled of 0.083 miles. Now, suppose the controller, with a 1-second time base, determines that the available power will only allow an acceleration of 4 mph/s at the start of the route. Given this acceleration, in 1 second, 0.0005 miles would be traveled. At this distance, the original route would have the vehicle traveling at 4.9 mph, so this velocity is used as the target velocity for the 1-second time step. Similarly, in the second 1 second interval, the vehicle traverses another 0.0017 miles, for a total distance of 0.0022 miles. On the original route, the vehicle would have been traveling at 9.8 mph at this time, so this is used as the target velocity for the 2-second time step. In this way, the route is progressively recomputed as a velocity over time profile as determined by the vehicles actual acceleration, as best determined by the predictive model.

The prediction processor may also utilize a GPS-based predictive system based on general driving patterns, or specific prior drive patterns for this driver learned at particular locations, to predict where the driver will likely use the brakes. By predicting where the driver will likely brake, the control processor can opt not to charge the energy storage element from the fuel consuming engine when braking is expected before the power from the energy storage element would be needed for acceleration. The GPS can learn particular places where braking historically occurs and/or can predict from map information where braking is likely to occur (e.g. stop signs, intersections, traffic lights, steep downhill roads, etc.). These can either be learned by a specific car, or crowd-sourced from a large number of vehicles and downloaded to the vehicle power flow controller. In addition to learning braking behavior, the control system can learn and utilize other location-based driver-specific behavior. One example is the driver's acceleration on an entrance ramp to a limited access highway. This information can be used to improve the accuracy of the predicted power required by vehicle being driven the driver at that location.

In addition to enhancing, e.g., maximizing, the ability to accelerate, the control system may optimize the uniformity of the driver experience. For example, a driver may prefer the vehicle to behave in a similar manner every time the accelerator pedal is depressed in a similar driving situation. Using historical data or a set of fixed constraints, the control system may opt to not deliver the full available power in favor of delivering a predictable traction power to the vehicle.

In some cases, the control system may reduce or limit the power delivered from the flywheel (or other energy storage device) in
anticipation of a long, heavy demand that would otherwise deplete the flywheel and result in the driver losing significant power. For example, given a long hill climb that the flywheel only has enough energy to give the driver the full power demanded for a portion, e.g., half, the hill climb, the control system might limit the power delivered from the flywheel to a fraction, e.g., half, of the full power demanded so that the power delivered lasts the full duration of the hill climb. As a result, the driver does not experience a sudden slowdown halfway up the hill.

Some embodiments target constant energy storage device power output for the duration of a hill climb (i.e. distance driven where demanded power is expected to exceed power that can be delivered by the relatively small engine alone). In another embodiment, the control processor specifically targets maintaining a constant vehicle speed—first using up excessive kinetic energy, and engine power only (no energy storage device input, preserving energy storage device energy) until the vehicle slows down to a speed that can be maintained for the whole hill climb given the remaining energy storage device power and engine power. Some embodiments may deliver the highest possible minimum speed, thus reducing the disutility experienced by the driver.

Embodiments described herein are directed to a vehicle power flow control system for high DOH hybrids that optimizes some variable (e.g. fuel economy) subject to ensuring adequate power availability for acceleration. In some embodiments the vehicle power flow control system is configured to provide a mix of adequate power and predictable response. The vehicle power flow control system can be configured to control power flow from the engine and energy storage device and/or engine operating point. The hybrid vehicle may comprise a variety of types (series, parallel, etc.), and/or storage type (flywheel, ultracapacitor, battery, etc.). The control of the vehicle may be based on various types of information, e.g., predicted, sensed, learned, empirical, crowdsourced, as described above.

Various types of predictive control algorithms may be used to control the power flows and/or operating points. In an embodiment of the power flow control system, the predictive control algorithm may include a model of the powertrain and expected power profile of the remainder of the route in a multi-objective optimization framework to derive the control inputs for the power flow between components. Such an optimization would have to trade off between performance and efficiency. Depending on the power profile of the route, the controller may have to trade off between short-term performance (e.g. accelerating up an oncoming hill) and long-term performance (e.g. maintaining reasonable speed over the whole route). The prediction horizon considered can also vary from the full remaining route to the next few miles, or an even shorter distance, depending upon the energy storage capacity and the rate at which it is depleted. Some examples of such control strategies are model-predictive control or receding-horizon control. Some embodiments may include algorithms for comparing the traversed route to a stored history of routes (possibly parameterized by time-of-day to account for traffic, and weather) to estimate the future power demands and optimize the control inputs for that estimate. Stochastic estimates of all roads based on existing traffic patterns could also be pre-computed and used by the controller.

Some implementations involve reducing or limiting the power delivered from the flywheel (or other energy storage device) in anticipation of a long, heavy demand that would otherwise deplete the flywheel and result in the driver losing significant power. Some configurations employ a GPS-based predictive control system that makes predictions based on general driving patterns, or specific prior drive patterns for this driver learned in particular locations. As an example, a GPS-based predictive control system may use specific prior drive patterns for a driver learned in particular location to predict where the driver will likely use the brakes. As another example, a GPS-based predictive control system may anticipate high power demands, such as freeway on-ramps, and control the power flow from the engine and energy storage device and/or from the power regeneration system to the energy storage device, e.g., battery, capacitor, or flywheel, to provide sufficient charge in time for the demand.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A hybrid vehicle, comprising:
a fuel consuming engine configured to supply power to drive the hybrid vehicle;
an energy storage device disposed within the hybrid vehicle, the energy storage device configured to supply power to drive the hybrid vehicle;
a charging system coupled to the energy storage device and configured to charge the energy storage device;
a movement system configured to provide for movement of the hybrid vehicle;
a drive train coupled between the movement system and one or both of the fuel consuming engine and the energy storage device;
a prediction processor configured to predict power demand to drive the hybrid vehicle based on changing conditions during operation of the hybrid vehicle, the prediction processor configured to:
use a degradation model to predict degradation of one or more hybrid vehicle components of the fuel consuming engine, the drive train, the movement system, and/or the charging system of the hybrid vehicle; and
revise the degradation model based on sensed changes in a condition of the one or more hybrid vehicle components;
a power flow controller configured to automatically control power flow between at least one of:
the fuel consuming engine and the drive train,
the energy storage device and the drive train, and
the fuel consuming engine and the energy storage device, so as to provide the power to drive the hybrid vehicle based at least in part on the predicted power demand and on the degradation model, wherein the power demand to drive the hybrid vehicle is greater than a maximum power available from the engine at a point in time during operation of the hybrid vehicle.

2. The hybrid vehicle of claim 1, wherein the energy storage device comprises at least one of:
a flywheel;
a battery; and
a capacitor.

3. The hybrid vehicle of claim 1, wherein the changing conditions include one or more of:
sensed conditions external to the hybrid vehicle;
sensed conditions of the hybrid vehicle;
predicted changes in one or more vehicle components;
predicted conditions external to the vehicle;
driver-specified conditions;
energy usage from the energy storage device;
energy usage by the fuel consuming engine;
historical data;
predicted destination; and
predicted route.

4. The hybrid vehicle of claim 1, further comprising one or more sensors coupled to the prediction processor, wherein the one or more sensors are configured to sense one or more of the changing conditions and the prediction processor is configured to predict the power demand to drive the vehicle based on the changing conditions.

5. The hybrid vehicle of claim 1, wherein the degradation model comprises a degradation equation.

6. The hybrid vehicle of claim 1, wherein the degradation model comprises a look up table.

7. The hybrid vehicle of claim 1, wherein the degradation model includes multiple models, each of the multiple models associated with a component of the hybrid vehicle.

8. The hybrid vehicle of claim 1, wherein the prediction processor is configured to revise the degradation model based on predicted changes to the one or more hybrid vehicle components.

9. The hybrid vehicle of claim 1, further comprising a driver interface configured to:
enable a driver to enter a selection between a first route that would cause a time delay in reaching the destination and a second route that would cause at least one of an increase in fuel consumption compared to the first route and an increase in vehicle emissions compared to the first route; and
wherein the prediction processor is configured to use the selection to predict the power demand.

10. A hybrid vehicle control system, comprising:
a prediction processor configured to predict power demand to drive a hybrid vehicle based on changing conditions during operation of the hybrid vehicle, the hybrid vehicle comprising a fuel consuming engine, an energy storage device, a charging system for the energy storage device, a movement system, and a drive train coupled between the movement system and one or both of the fuel consuming engine and the energy storage device, the prediction processor configured to:
use a degradation model to predict degradation of one or more hybrid vehicle components of the fuel consuming engine, drive train, movement system, and/or charging system of the hybrid vehicle; and
revise the degradation model based on sensed changes in a condition of the one or more hybrid vehicle components; and a power flow controller configured to automatically control power flow between at least one of:
the engine and the drive train,
the energy storage device and the drive train, and
the engine and the energy storage device, so as to provide the power to drive the hybrid vehicle based at least in part on the predicted power demand and on the degradation model, wherein the power demand to drive the hybrid vehicle is greater than a maximum power available from the engine at a point in time during operation of the hybrid vehicle.

11. The hybrid vehicle control system of claim 10, wherein the controller is further configured to control regenerative power flow to the energy storage device.

12. The hybrid vehicle control system of claim 10, wherein:
the prediction processor is configured to predict one or more conditions external to the hybrid vehicle, the one or more external conditions including traffic, weather, road conditions and traffic accidents; and
the controller is configured to control power flow from the engine and the energy storage device based on predictions of the one or more external conditions.

13. The hybrid vehicle control system of claim 10, wherein the prediction processor is configured to:
collect at least one of vehicle-specific and driver-specific historical data;
predict a route based on the historical data; and
determine at least one drive parameter based on the predicted route, wherein the at least one drive parameter is predicted based on the predicted power demand and predicted available power associated with the predicted route, and the at least one drive parameter includes time to destination, emissions to destination, and fuel consumption to destination associated with the predicted route.

14. The hybrid vehicle control system of claim 10, wherein the prediction processor is configured to predict a route-specific vehicle power demand associated with each of multiple potential routes, wherein the route-specific vehicle power demand is based on one or more of weather, component degradation, predicted traffic conditions, driver specified constraints on vehicle emissions, driver-specified vehicle behavior, driver-specified constraints on arrival time at the destination, driver-specified constraints on fuel consumption.

15. The hybrid vehicle control system of claim 10, wherein the prediction processor is configured to predict the vehicle power demand using one or more of:
a Monte Carlo algorithm in a model-predictive control framework;
stochastic programming;
an adaptive optimization control algorithm, one or more parameters of the adaptive optimization control algorithm revised based on real-time data; and
an autoregressive model configured to account for differences in predicted and actual time evolution of traffic.

16. The hybrid vehicle control system of claim 10, further comprising one or more sensors coupled to the prediction processor, wherein the one or more sensors are configured to sense at least one of a condition of the hybrid vehicle and a condition external to the hybrid vehicle.

17. A computer implemented method, comprising:
predicting, in a prediction processor, hybrid vehicle power demand to drive a hybrid vehicle, the hybrid vehicle comprising a fuel consuming engine, an energy storage device, a charging system for the energy storage device, a movement system, and a drive train coupled between the movement system and one or both of the fuel consuming engine and the energy storage device, the predicting based on changing conditions during operation of the hybrid vehicle and comprising:
predicting degradation of one or more hybrid vehicle components of the fuel consuming engine, drive train, movement system, and/or charging system of the hybrid vehicle using a degradation model; and
revising the degradation model based on sensed changes in a condition of the one or more hybrid vehicle components;
controlling, in a control processor, the power flow so as to provide power to drive the hybrid vehicle based on the predicted hybrid vehicle power demand and on an output of the degradation model, wherein the predicted hybrid vehicle power demand is greater than a maximum power available from the engine at a point in time during operation of the hybrid vehicle.

18. The method of claim 17, wherein predicting the vehicle power demand based on changing conditions comprises predicting based on one or more of:
sensed conditions of the hybrid vehicle;
sensed conditions external to the hybrid vehicle;
driver-specified conditions; and
information stored in a historical database.

19. The method of claim 17, wherein predicting degradation of the one or more hybrid vehicle components comprises predicting degradation using an equation.

20. The method of claim 17, wherein predicting degradation of the one or more hybrid vehicle components comprises predicting degradation by accessing a look up table.

* * * * *